June 2, 1931. E. P. BULLARD, JR 1,807,829
DOUBLE ANGULAR TOOL SLIDE
Filed Dec. 12, 1928 6 Sheets-Sheet 1

INVENTOR:
Edward P. Bullard, Jr.
BY Chamberlain & Newman
ATTORNEYS.

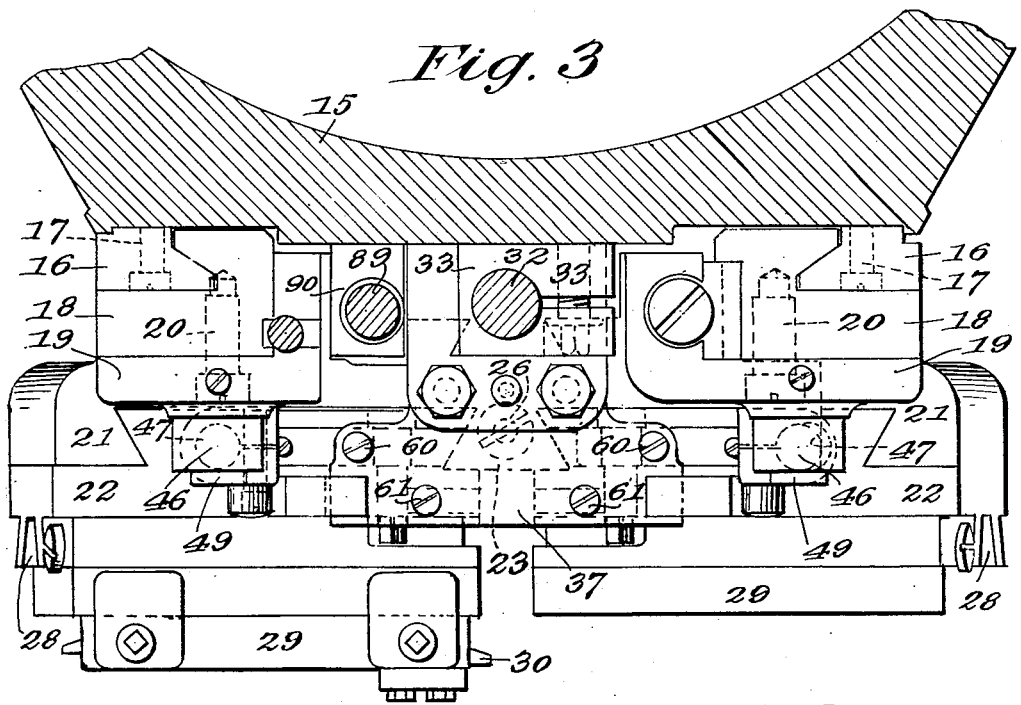
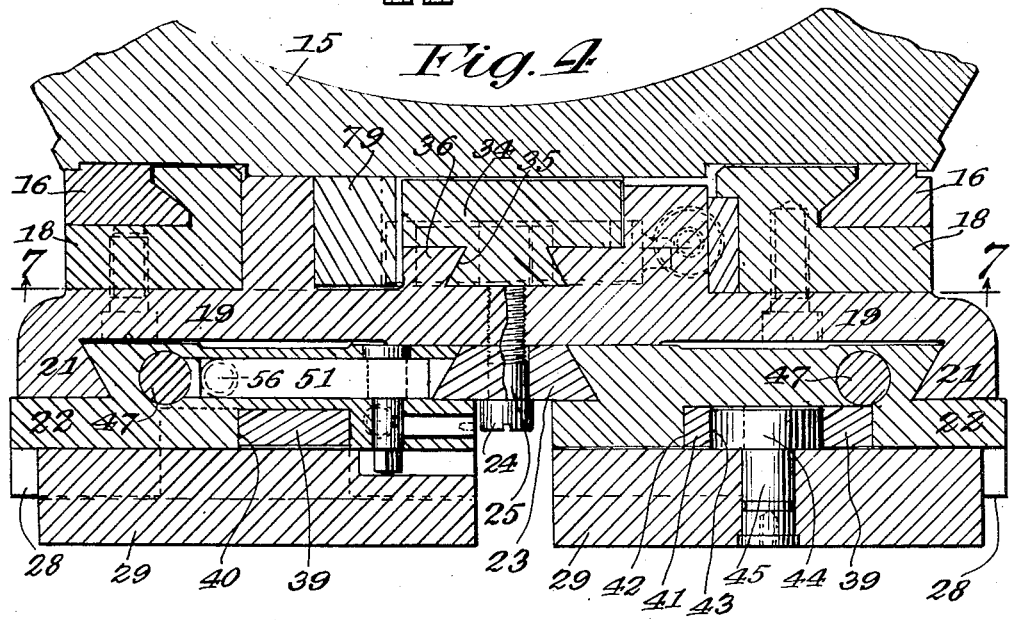

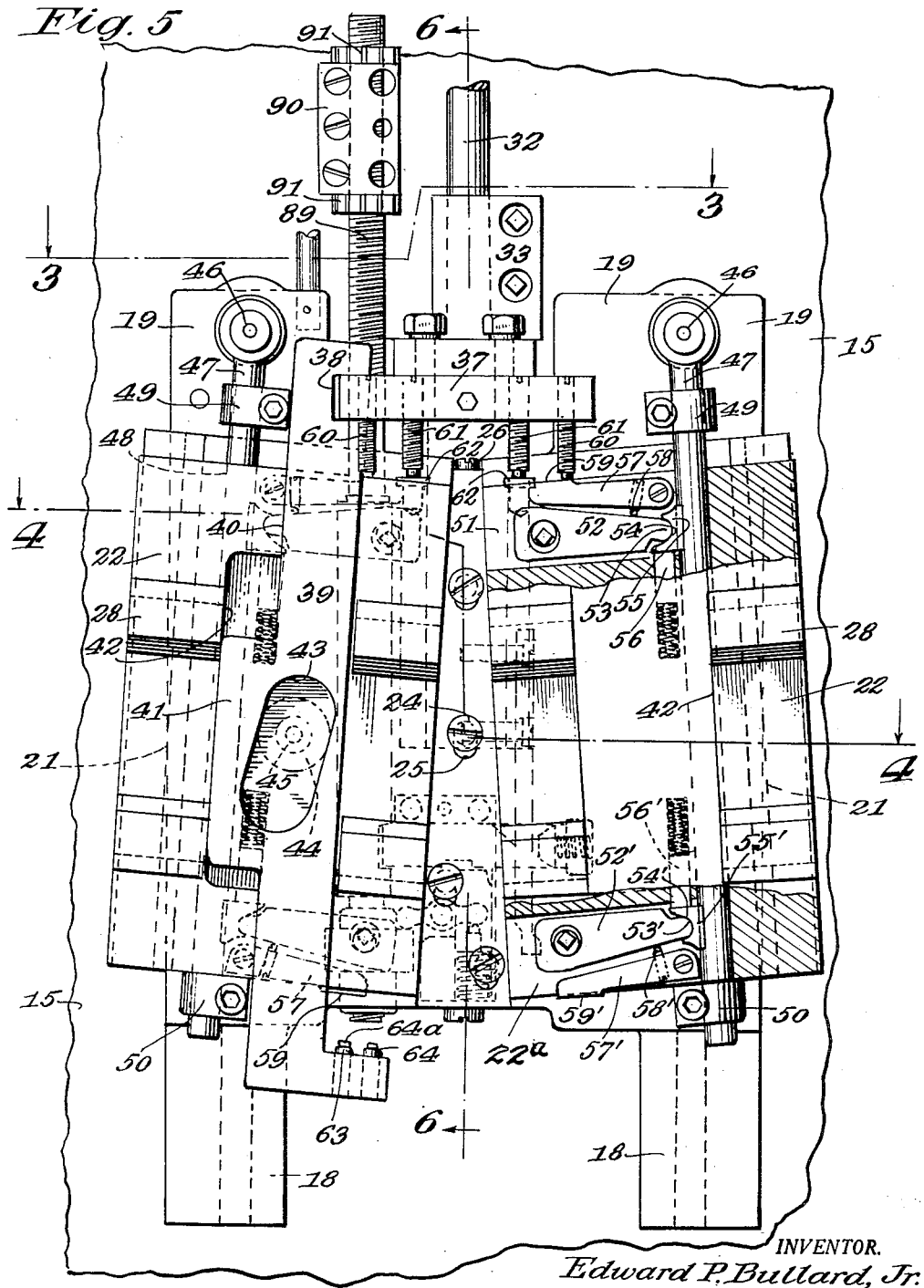

June 2, 1931.  E. P. BULLARD, JR  1,807,829
DOUBLE ANGULAR TOOL SLIDE
Filed Dec. 12, 1928   6 Sheets-Sheet 5

INVENTOR.
Edward P. Bullard, Jr.
BY
Chamberlain & Newman
ATTORNEYS.

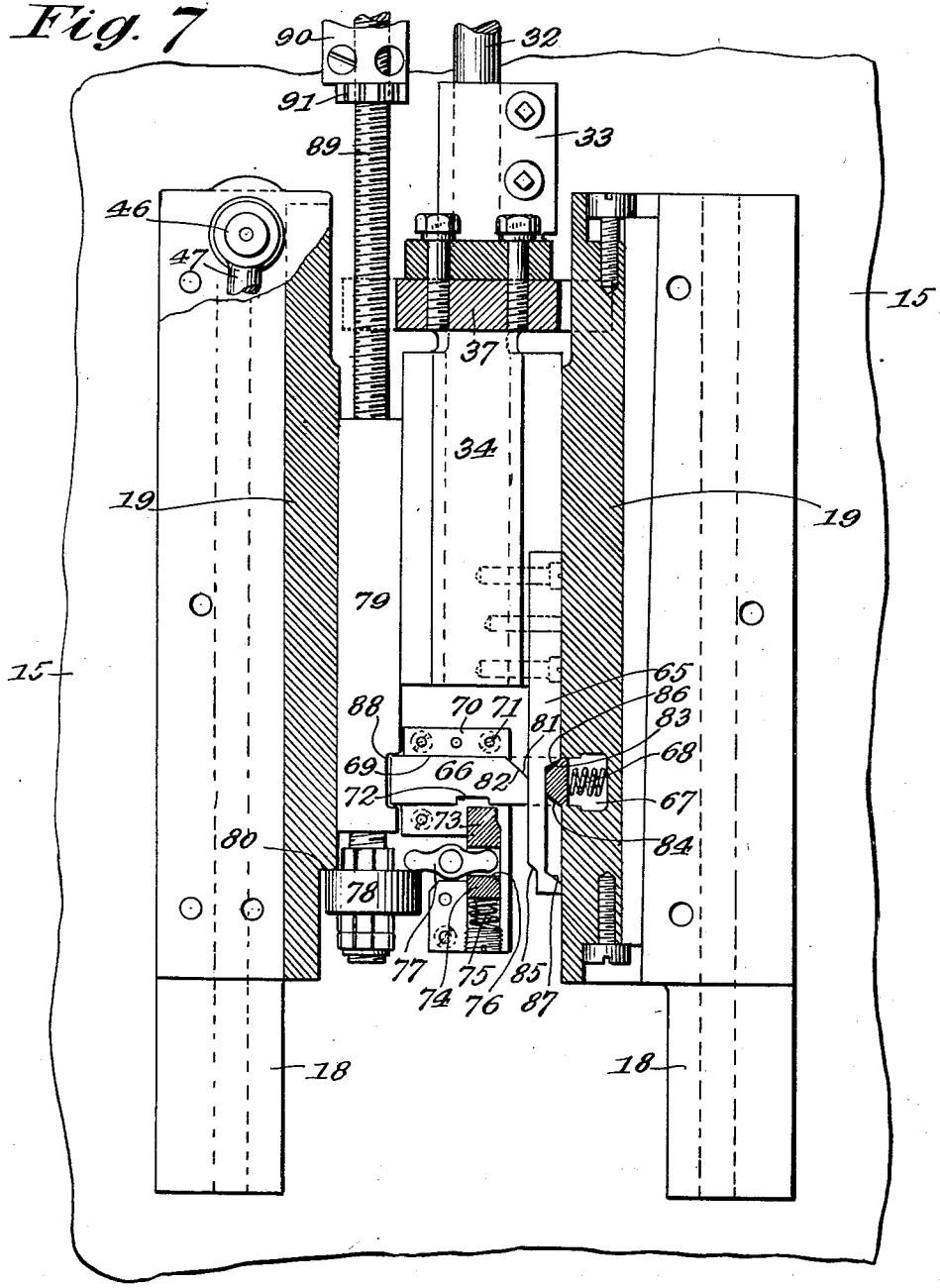

Patented June 2, 1931

1,807,829

UNITED STATES PATENT OFFICE

EDWARD P. BULLARD, JR., OF STRATFORD, CONNECTICUT, ASSIGNOR TO THE BULLARD COMPANY, OF BRIDGEPORT, CONNECTICUT, A CORPORATION OF CONNECTICUT

DOUBLE ANGULAR TOOL SLIDE

Application filed December 12, 1928. Serial No. 325,425.

The present invention relates to an improved tool slide for machine tools, particularly of the type in which the work is mounted on one or more rotary work tables and is worked upon by tools carried in one or more tool heads. While the invention is illustrated in connection with a turret type of machine, in which there are a plurality of work tables and tool heads, it is also adapted for use where only one work table and one tool head is employed. A machine of this general type is disclosed in my prior U. S. Patent #1,360,175, dated November 23, 1920, and it will be understood that the mechanism shown therein for rotating and indexing the work tables and for reciprocating the tool slides may also be employed in the present machine.

It is particularly proposed to provide a double tool slide of this character for simultaneously producing longitudinal angular or taper cuts of the work, as for instance in the surfacing of a wheel hub, and to this end it is proposed, in the present embodiment, to provide means in cooperative relation to the vertical feed for the tool heads, whereby the latter are fed laterally into relation with the work, and then fed in an inclined direction corresponding to the desired taper cut.

With the above and other objects in view an embodiment of the invention is shown in the accompanying drawings, and this embodiment will be hereinafter more fully described with reference thereto, and the invention will be finally pointed out in the claims.

In the drawings:

Fig. 3 is a horizontal sectional view taken above one of the tool slides, being along the line 3—3 of Fig. 5;

Fig. 4 is a horizontal sectional view taken along the line 4—4 of Fig. 5;

Fig. 5 is a front elevation of the tool slide mechanism, the tool carrying heads being removed, and the cam slide being removed at the right side of the figure;

Fig. 7 is a vertical sectional view taken along the line 7—7 of Fig. 4, and showing the saddle locking mechanism employed;

Similar reference characters indicate corresponding parts throughout the several figures of the drawings.

Figure 1:
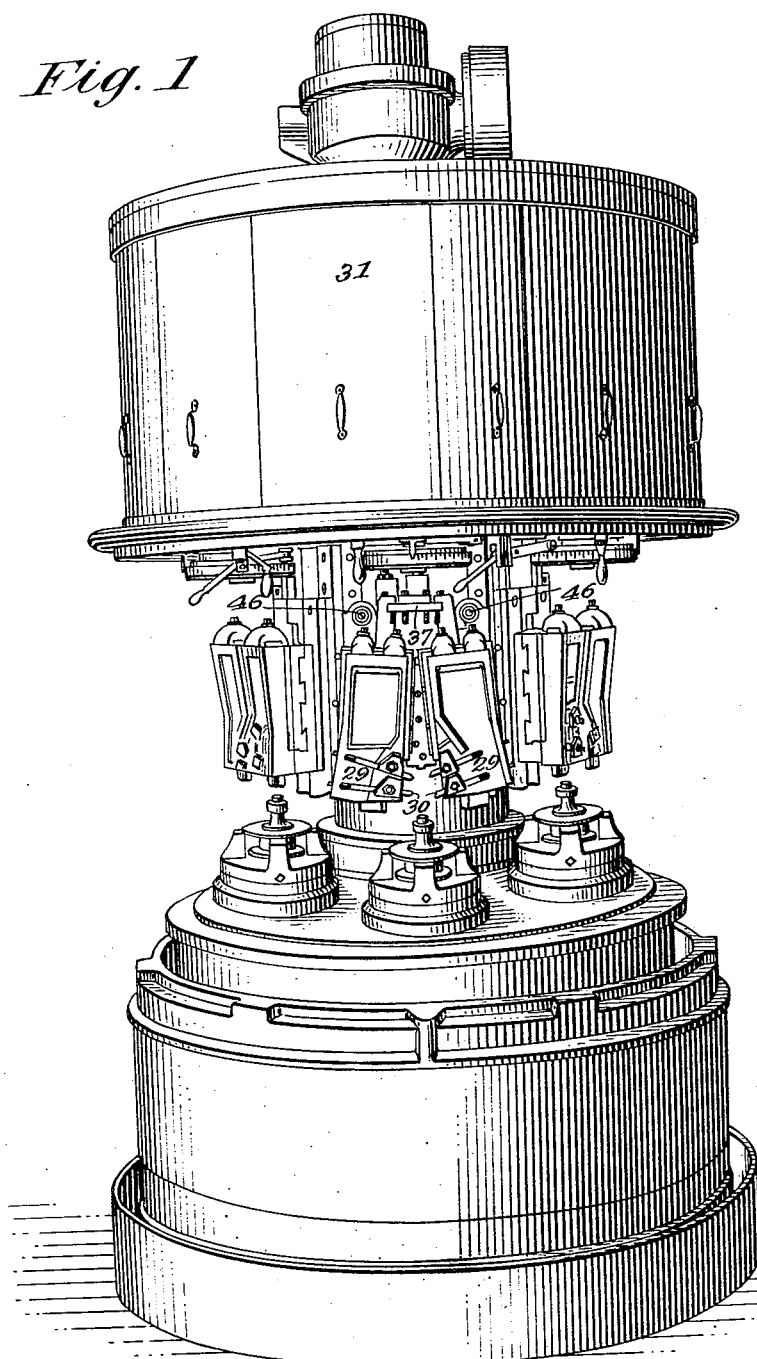
Fig. 1 is a front perspective view of a machine of the multiple spindle type embodying the present invention.
Figure 2:
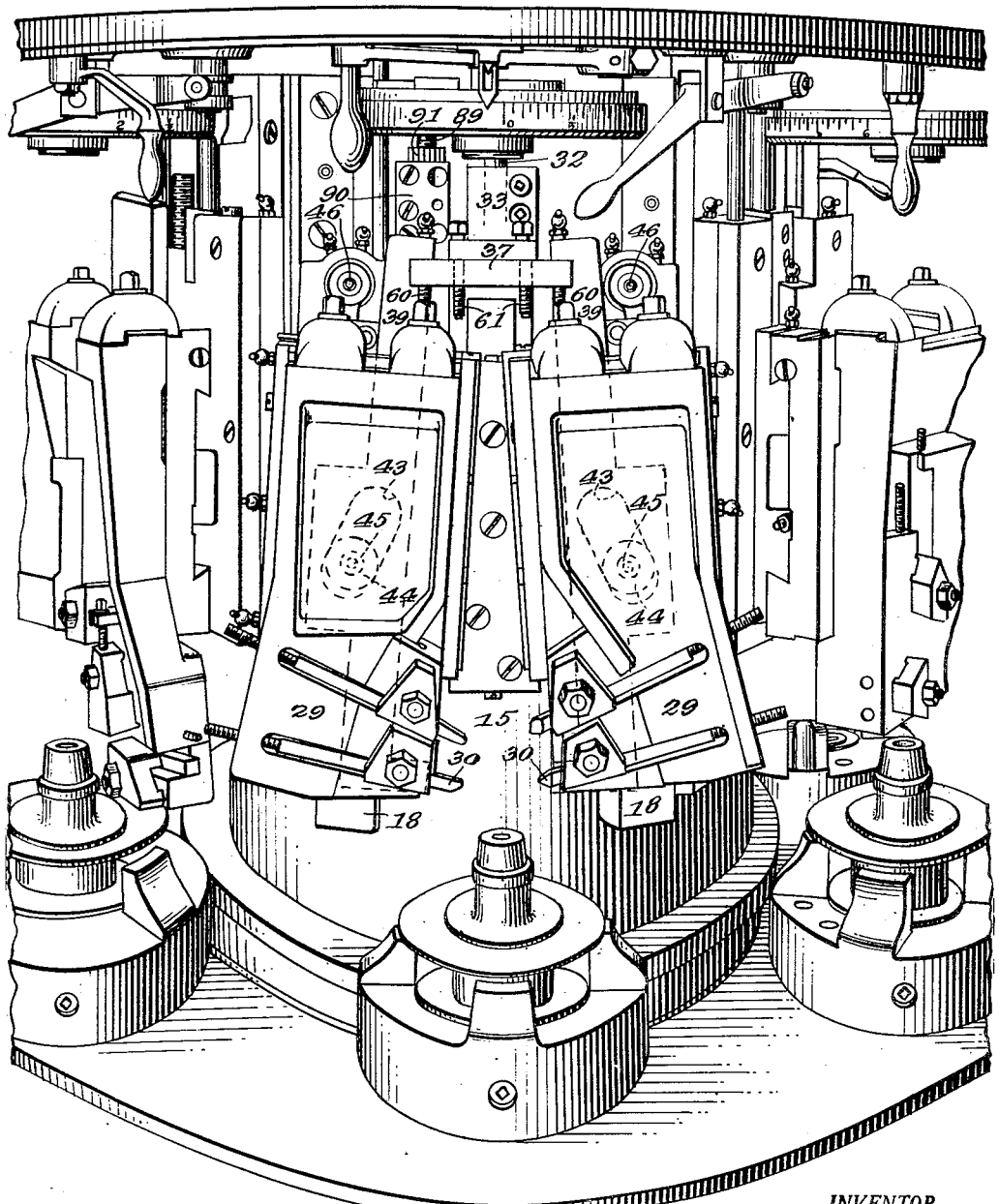
Fig. 2 is an enlarged view of the central portion of the machine, as shown in Fig. 1, and showing the work tables and tool slides.
Figure 8:
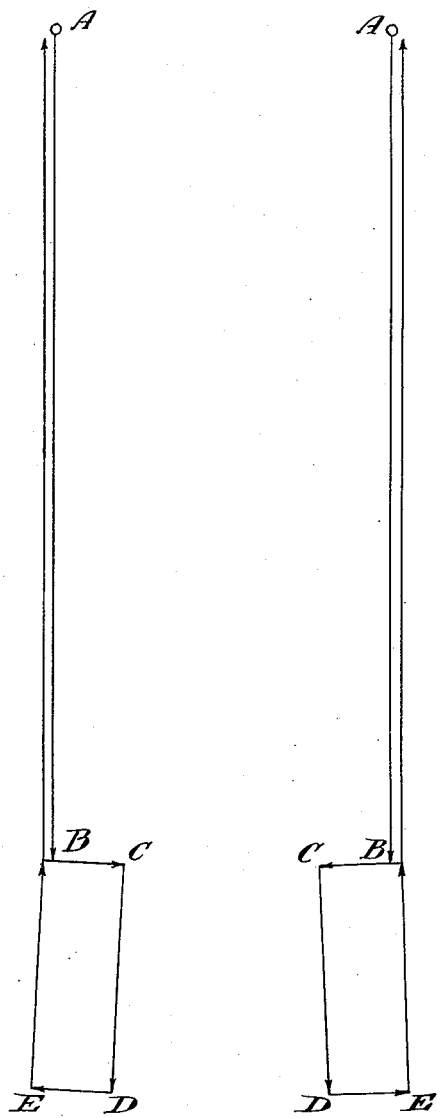
Fig. 8 is a diagrammatic view, showing the direction of feed of the saddle and tool slides.

The tools, as shown in Figs. 1 and 2, are in their upper or starting position, and if adjusted to machine a wheel hub as shown in the chucks, the line of travel of the tools would be substantially similar to that indicated by the diagrammatic view, Fig. 8, and in which is shown the lines of travel of the saddle and the two oppositely disposed tool slides, as illustrated in the present embodiment.

In this diagram A—B represents the rapid traverse down feed of the saddle and tool slides for approaching the work, B—C represents the lateral inward traverse of the tool slides to engage the work; C—D represents the feed or actual cutting movements of the tool slides, this movement corresponding to the taper cut, D—E represents the lateral outward rapid traverse movement of the tool slides away from the work for the clearance of the two preparatory to the upward rapid return movement, E—B represents the rapid upward return of the tool slides, and B—A represents the rapid upward return of the saddle and tool slides.

It will be obvious that slight variations in the line and speed of travel of the tools may be made, depending upon the particular kind of work to be turned, and in machines of this type where several work stations are employed such variations and adjustments can readily be made as to take care of the slight differences in the work to be performed at each station, since it is customary to equally divide the time required for the completion of a given piece into equal portions.

Figure 6:
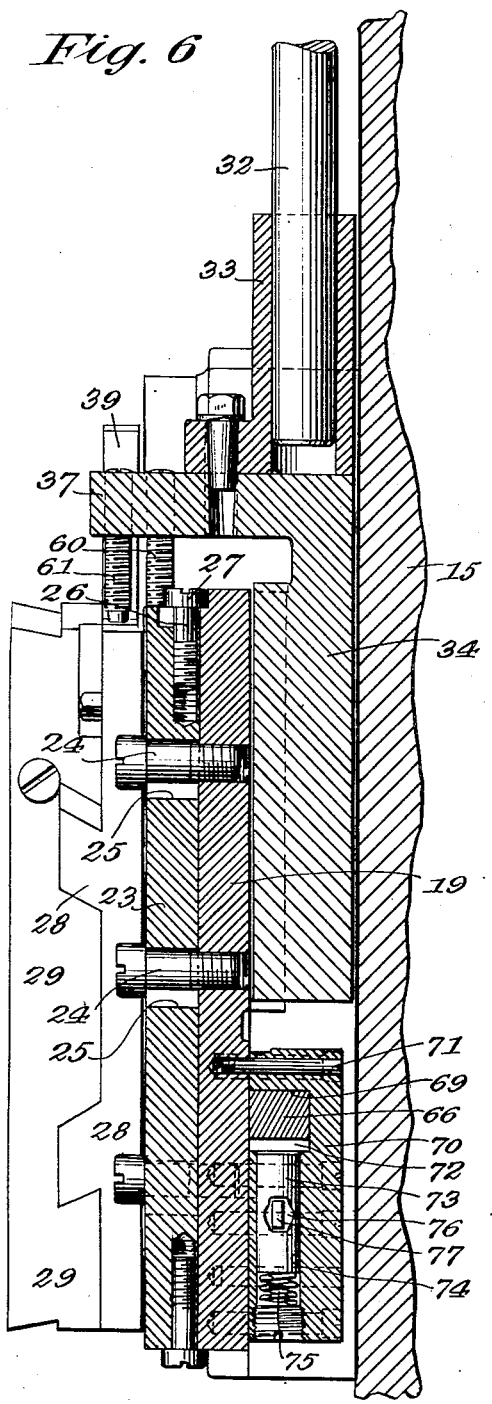
Fig. 6 is a vertical sectional view, taken along the line 6—6 of Fig. 5.

Referring in detail to the characters of reference marked upon the drawings, 15 represents the hollow stationary column, such as is used in the Bullard Mult-Au-Matic, to which vertical ways 16 are secured by screws 17 and form vertical guides for the vertical ways 18, secured upon the rear of the saddle 19 by means screws 20, and whereby the saddle is permitted to be moved vertically. The saddle is provided at each of its side edges with ways 21 tapered outwardly with respect to each other, and adapted to receive and operatively support the outer edges of the two taper feed slides 22, the inner edges of which are guided and supported by a tapered gib 23 secured to the saddle 19 by screws 24 engaged in slots 25 in the gib, and which permit of slight adjustment of the gib to provide the proper bearing clearance for the slides, this adjustment being made by a screw 26 (Fig. 6) provided in the upper end of the gib and having its head bearing in a shouldered recess 27 of the saddle. The slides 22 are each provided with ways 28, inclined inwardly and downwardly in the present embodiment, being at right angles to the inclined lines of feed of said slides, and laterally movable tool heads 29 are mounted on these ways, the tools 30 being carried upon these tool heads in suitable arrangement for the particular work being done.

The parts thus far mentioned, together with their connected and associated parts, later to be described, are operated from a feed works cam (not shown), contained within the enclosure 31, Fig. 1, in the upper part of the machine, this feed cam functioning through the cam feed rod 32, which extends down through the floor of the enclosure and is secured by a clamping collar 33 to the upper end of a central slide 34. This central slide is provided with suitable dove-tailed ways 35 which fit into corresponding dove-tailed ways 36 of the saddle 19, so that the central slide in addition to imparting vertical movement to the saddle may also have a further vertical movement, independent of the saddle, and as will hereinafter more fully appear.

At the upper end of the central slide there is provided a flange 37 projected forwardly and at each side, and which is slidably engaged at its ends in slots 38 in the upper inner edge portions of oppositely positioned vertically movable cam slides 39, respectively engaged in guide slots 40 in the taper feed slides 22.

As before suggested, the machine disclosed in the present embodiment is what may be termed a double tool slide type, that is, a slide having duplicate mechanisms for supporting and feeding two tool heads, positioned in opposite relation, and as seen by the operator, constitute right and left tool heads, the work being supported intermediate said tool heads and engaged on opposite sides by the tools. The operable parts or mechanism on each side of the central slide 34, are duplicates, and are designed to operate simultaneously and in like manner, so that, for conveniences in description, the mechanism at one side only will be described in detail, the same reference characters being applied to corresponding parts at the other side.

The cam slide 39 is provided at its rear edge and intermediate its ends with a projection or enlargement 41 disposed in a substantially longer recessed portion 42 of the slot 40, and whereby the cam slide may have relative reciprocating movement with respect to the taper feed slide. Within the intermediate widened portion of the cam slide there is provided a diagonally disposed cam slot 43 engaged by a cam roller 44, mounted upon a stud 45 carried upon the inner side of the tool head 29, so that reciprocating movement of the cam slide will impart lateral or cross feed movement to the tool head along a slight incline corresponding to the direction of the ways 28, and at a speed and extent corresponding to the pitch of said cam slot.

Upon each side of the saddle 19 there is pivotally mounted at 46 a stop rod 47, extending downwardly through a passage 48 in the taper feed slide 22, and disposed in parallel relation to the inclined line of feed of said slide. Upon this rod there are provided stop collars 49 and 50 respectively disposed above and below the slide 22 and so spaced with respect to said slide as to permit of a limited sliding movement thereof with respect to said rod, this movement corresponding to the taper feed movement of the slide in relation to the work. Obviously these collars may be adjusted to vary the extent of this movement.

In order to support the taper feed slide 22 in its upper position with respect to the rod 47, that is, with its upper end against the upper stop collar 49, during relative down feed of the cam slide 39, and also to secure it in its lower position against the stop collar 50 during relative upward feed of the cam slide, friction toggle means are provided within the slide 22, which grip upon the rod 47, and which are automatically released at the proper point in the feed, as will presently more fully appear.

A recess 51 is provided in the upper end of the slide 22, within which there is pivotally mounted a lever arm 52 provided with a rounded end 53, engaged in the recessed outer surface 54 of a gripping shoe 55, engaging the rod 47 and normally pressed upwardly by means of a spring pressed plunger 56. The spacing of the shoe from the pivotal point of the lever arm is slightly less than the radius of the rod, so that downward pressure on the slide will tend to tightly press the shoe against the rod to grippingly secure the slide, while upward pressure will release this gripping relation. In addition to the releasing action through upward pressure of the slide, the shoe is also adapted to be independently released during downward movement of the slide relatively to the rod, and for this purpose a trigger lever 57 is pivotally mounted above the lever arm 52, and is provided at its under side and with an adjustable contact screw 58 bearing upon the lever arm, while at its upper side and at its outer end there is provided a contact surface 59, adapted to be engaged by means, presently to be described, for depressing the trigger lever and thereby releasing the gripping shoe through downward pressure on the lever arm 52.

At the lower end of the slide 22 there is provided a recess 22$^a$, in which a similar, but reversely disposed and functioning, toggle gripping means is provided. The parts of this mechanisms are identical, and are given the reference characters 52$^1$ to 59$^1$, to correspond to the parts 52 to 59 of the upper toggle gripping mechanism.

The flange 37 of the central slide 34 is provided at each side, and in relation to each of the taper feed slides, with two adjustable contact screws 60 and 61, the screw 60 being adapted to contact with the surface 59 of the trigger lever 57 to release the upper toggle gripping mechanism, while the screw 61 contacts with a hardened contact plug 62 set in the upper end of the slide 22.

It should be here pointed out that during the downward rapid feed of the saddle and tool slides, represented by the line A—B, Fig. 8, the parts are in the position indicated in Fig. 2, the taper slides 22 being in their upper position upon the rods 47 against the stop collars 49, and the flange 37 being spaced above the slides with the cam slides 39 in their upwardly moved position relative to the taper slides, and wherein the tool heads are in their outwardly moved or retracted position. At the point B, mechanism, hereinafter more fully referred to, comes into play to arrest the feed of the saddle, while permitting further independent movement of the central slide 34, and consequent relative movement of the tool heads and taper slides.

The cam slide is provided at its lower end with a projected portion 63 in which two contact screws 64 and 64$^a$ are mounted, the screw 64 adapted upon upward return movement of the cam slide relative to the taper feed slide 22 to contact with the trigger lever 59 to release the lower toggle gripping mechanism, while the screw 64$^a$ bears upon the lower side of the slide 22 to impart upward movement to it relative to the rod 47, this movement continuing until the slide abuts the stop collar 49, and at which point the saddle is connected by the locking mechanism presently to be described.

The mechanism for locking and releasing the saddle with respect to the central slide 34 will now be described. Upon one side of the central slide 34 there is secured a downwardly extending cam bar 65, which engages a locking pin 66, mounted in part in a pocket 67 of the saddle, and in which is also provided a spring 68 that acts upon the pin to project the same outward. The other end portion of the locking pin is slidably mounted in the horizontal slot 69 of a bracket 70 secured by screws 71 to the inner face of the saddle 19, and is provided with a notch 72 in its lower side adapted to be engaged by a detent plunger 73, slidably mounted in a vertical slot 74 of the bracket. The detent is yieldably held in engagement with the pin by means of a spring 75, and is provided with a pocket 76, into which one end of a trip lever 77 extends, and whereby the detent is adapted to be disengaged from the locking pin to free the same when said trip lever engages a vertically adjustable stop collar 78 mounted at the lower end of a stop bar 79. A shoulder 80 upon the saddle also engages the stop collar 78, at the point in its downward movement where the trip lever 77 is engaged to retract the detent, and arrests further downward movement of the saddle.

The locking pin 66 is further provided with a vertical passage 81 having specially shaped side walls which include an incline 82 upon one side and inclines 83 and 84 upon the other. These inclines are engaged at certain points in the feed by corresponding inclines 85, 86 and 87 upon the cam bar 65, so as to more positively control the positions and operation of the locking pin. In this connection it will be seen that during the rapid down feed represented by the line A—B, Fig. 8, and in which relation the bar 65 is in its upper position with respect to the locking pin, which is held in its retracted position by the detent 73, the tendency of the bar 65 is to bear downwardly upon the locking pin through engagement of the incline 85 with the incline 82, so that the downward movement of the saddle and central slide 34 as a unit is insured. This relation continues until the free end of the lever 77, carried by the saddle, engages the stop collar 78, which action causes withdrawal of the detent 73 from the notch 72 of the locking pin, and allows the latter to be projected by the combined action of its spring 68 and the downward pressure of the bevel surface 85 upon the bevel surface 82 into the pocket 88 of the stop bar 79, as shown in Fig. 7. At this point the saddle is also positively held against further downward movement by engagement of the shoulder 80 with the stop collar 78.

The stop bar 79 is adjustably mounted on the column and is adapted to be raised and lowered to position its pocket 88 at various heights from the work table, and so as to stop the down feed of the saddle at any desired point and to throw in the cross and taper feeds. For this purpose the stop bar is suspended upon an adjustable screw 89, that is threadably mounted in a bearing 90 secured to the face of the column, lock-nuts 91 being mounted upon the screw 89 above and below the bearing, so that the screw may be positively locked after it has been adjusted to the position required.

The projection of the locking pin not only locks the position of the saddle, but releases the bar 65 so that it may move downwardly through the locking pin, thus permitting the continued downward movement of the feed rod 32 and the central slide 34 independently of the saddle. Relative downward movement of the taper feed slides 22 being arrested at this point by the action of the upper toggle gripping dogs 55, the continued downward movement of the central slide moves the cam slides 39 downwardly relatively to the taper feed slides 22, causing the tool heads to be moved inwardly toward the work through the action of the cam slots 43, this movement being represented by the lines B—C, Fig. 8.

At the point where the tool heads reach their inwardly moved positions in relation to the work, represented by C in the diagram, Fig. 8, the contact screws 60 and 61 come into relation with the upper ends of the taper feed slides, the screws 60 bearing upon the trigger levers 57 of the upper toggle gripping mechanisms and releasing the gripping dogs 55, and the screws 61 engaging the contact plugs 62 and imparting downward movement to the taper feed slides 22, the lower gripping dogs 55¹ dragging along the rods 47 during this movement. This movement is represented by the lines C—D in the diagram, Fig. 8, and is the taper cutting feed of the tools in relation to the work.

At the end of this downward movement, the point D in the diagram, the cam feed rod 32 starts its upward movement, this being brought about by the cam in the feed works. The flange 37 of the central slides moves upwardly away from the taper feed slides 22, backing the screws 60 away from the trigger levers 57 permitting the toggle gripping dogs 55 to grip the rods 47 to arrest upward movement of the taper feed slides 22. The cam slides 39 are therefore drawn upwardly relatively to the slides 22, the cam slots 43 causing the tool heads to be moved outwardly away from the work, this movement being represented by the lines D—E in the diagram, Fig. 8. At the point E the contact screws 64 at the lower end of the cam slide contact with the trigger levers 57¹ of the lower toggle gripping mechanisms releasing the slides 22, the contact screws 64ª at the same time contacting with the lower ends of the slides 22, and the continued upward movement of the cam slides moving the slides 22 upwardly upon the rods 47, this movement being represented by the lines E—B in the diagram, Fig. 8.

As the slides reach the point B in this upward movement the bevel 87 of the bar 85 engages the bevel 84 of the locking pin and retracts it, withdrawing its end from the notch 88 and releasing the saddle. The taper feed slides 22 then being in contact with the stop collars 49, the further upward movement of the feed rod 22 and central slide 34 moves the saddle upwardly, releasing the trip lever 77 from the stop 78, and permitting the detent 73 to enter the slot 72 of the locking pin to retain it in retracted position. The saddle and slides continue this upward vertical movement as a unit to the upper or starting position, this movement being represented by the lines B—A in the diagram, Fig. 8. The cycle is completed at the point A, the parts then being in position to start operation upon the next piece of work.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In an automatic machine tool, reciprocating feed means, a movable saddle, a relatively movable slide carried by said saddle, a tool head carried by said slide adapted to have movement relatively thereto, cam means carried by said slide and driven by said feed means adapted to impart movement to said tool head relatively to said slide, means whereby said slide is adapted to have movement imparted thereto by said feed means, and means for locking and releasing said saddle with respect to said feed means whereby they are adapted to move as a unit and whereby said feed means has independent movement relative to said saddle.

2. In an automatic machine tool, vertically reciprocating feed means, a vertically reciprocating saddle a slide carried by said saddle adapted to have movement in an inclined direction relative to the vertical movement of said saddle, a tool head carried by said slide adapted to have transverse movement relatively thereto, means carried by said slide and driven by said feed means adapted to impart movement to said tool head relatively to said slide, means whereby said slide is adapted to have movement imparted thereto by said feed means, and means for locking and releasing said saddle with respect to said feed means whereby they are adapted to move as a unit and whereby said feed means has independent movement relative to said saddle.

3. In an automatic machine tool, reciprocating feed means, a vertically reciprocating saddle, a relatively movable slide carried by said saddle, a tool head carried by said slide adapted to have movement relatively thereto, cam means carried by said slide and driven by said feed means adapted to impart movement to said tool head relatively to said slide, means whereby said feed means is adapted at the completion of said relative movement of said tool head to impart movement to said slide, and means for locking and releasing said saddle with respect to said feed means whereby they are adapted to move as a unit and whereby said feed means has independent movement relative to said saddle.

4. In an automatic machine tool, reciprocating feed means, a pair of movable slides disposed in opposed relation to each other, downwardly and outwardly diverging guideways for said slides, opposed tool heads carried by said respective slides adapted to have movement relatively thereto, means driven by said feed means adapted to impart movement to both of said tool heads relatively to said slides, and means whereby said slides are adapted to have movement imparted thereto by said feed means.

5. In an automatic machine tool, reciprocating feed means, a movable saddle, a pair of relatively movable slides carried by said saddle disposed in opposed relation to each other, opposed tool heads carried by said respective slides adapted to have movement relatively thereto, common means driven by said feed means adapted to impart movement to both of said tool heads relatively to said slides, means whereby said slides are adapted to have movement imparted thereto by said feed means, and means for locking and releasing said saddle with respect to said feed means whereby they are adapted to move as a unit and whereby said feed means has independent movement relative to said saddle.

6. In an automatic machine tool, reciprocating feed means, a movable saddle, a relatively movable slide carried by said saddle, a tool head carried by said slide adapted to have movement relatively thereto, means connecting the feed means and saddle whereby the saddle, slide and tool head are fed forwardly, an automatic trip device for releasing the saddle from the feed means, means operative between the feed means and said tool head whereby the latter is fed relatively to said slide after the trip device has released the saddle from the feed means, and means carried by said tool head operating means whereby said feed means is adapted at the completion of said relative movement of said tool head to impart movement to said slide.

7. In an automatic machine tool, reciprocating feed means, a movable saddle, a relatively movable slide carried by said saddle, releasable means for fixedly securing said slide with respect to said saddle, a tool head carried by said slide adapted to have movement relatively thereto, means connecting the feed means and saddle whereby the saddle, slide, and tool head are fed forwardly, an automatic trip device for releasing the saddle from the feed means, means operative between the feed means and said tool head whereby the latter is fed relatively to said slide after the trip device has released the saddle from the feed means, means carried by said tool head operating means operative between the feed means and slide whereby the latter is fed relatively to the saddle at the completion of said relative movement of the tool head.

8. In an automatic machine tool, reciprocating feed means, a reciprocating slide, a pair of releasable means for fixedly securing said slide, one of said means preventing movement of the slide in one direction, and permitting movement in the other direction, the other of said means permitting movement in said one direction and preventing movement in said other direction, a tool head carried by said slide adapted to have movement relatively thereto, means driven by said feed means adapted to impart movement to said tool head relatively to said slide, and means operative between the feed means and said releasable means and slide whereby the latter is fed at the completion of said relative movement of the tool head in either direction.

9. In an automatic machine tool, reciprocating feed means, a movable saddle, a relatively movable slide carried by said saddle, a tool head carried by said slide adapted to have movement relatively thereto, a cam slide carried by said slide adapted upon movement relative to said slide to impart transverse movement to said tool head, means for locking and releasing said saddle with respect to said feed means whereby they are adapted to move as a unit and whereby said feed means has independent movement relative to said saddle, means operatively connecting said feed means to said cam slide whereby said independent movement of said feed means imparts relative movement to said tool head, and means operatively connecting said feed means to said slide whereby said independent movement of the feed means imparts relative movement to said slide at the completion of the relative movement of said tool head in either direction.

10. In an automatic machine tool, reciprocating feed means, a movable saddle, a reciprocating slide carried by said saddle, a pair of releasable means for fixedly securing said slide with respect to said saddle, one of said means preventing movement of the slide in one direction, and permitting movement in the other direction, the other of said means permitting movement in said one direction and preventing movement in said other direction, a tool head carried by said slide adapted to have movement relatively thereto, a cam slide carried by said slide adapted upon movement relative to said slide to impart transverse movement to said tool head, means for locking and releasing said saddle with respect to said feed means whereby they are adapted to move as a unit and whereby said feed means has independent movement relative to said saddle, means operatively connecting said feed means to said cam slide whereby said independent movement of said feed means imparts relative movement to said tool head, and means operative between the feed means and said releasable means and slide whereby said independent movement of the feed means imparts relative movement to said slide at the completion of the relative movement of said tool head in either direction.

11. In an automatic machine tool, reciprocating feed means, a movable saddle, a pair of relatively movable slides carried by said saddle and disposed in opposed relation to each other, downwardly and outwardly diverging guideways for said slides, opposed tool heads carried by said respective slides adapted to have movement relatively thereto, a pair of cam slides also carried by said slides adapted upon movement relative to the slides in which they are mounted to impart transverse movement to both of said tool heads, means operatively connecting said feed means to said cam slides whereby movement of said feed means imparts relative movement to said tool heads, and means operatively connecting said feed means to said slides whereby movement is imparted thereto at the completion of the relative movement of said tool heads in either direction.

Signed at Bridgeport, in the county of Fairfield and State of Connecticut, this 11th day of December, A. D. 1928.

EDWARD P. BULLARD, Jr.